United States Patent [19]
Saeki et al.

[11] Patent Number: 5,572,112
[45] Date of Patent: Nov. 5, 1996

[54] POWER SUPPLY UNIT

[75] Inventors: Mitsuo Saeki; Hidekiyo Ozawa; Hidetoshi Yano, all of Kawasaki, Japan

[73] Assignee: Fujitsu Limited, Kawasaki, Japan

[21] Appl. No.: 412,582

[22] Filed: Mar. 29, 1995

[30] Foreign Application Priority Data

May 23, 1994 [JP] Japan ..................... 6-108114

[51] Int. Cl.⁶ ...................................... G05F 1/56
[52] U.S. Cl. ........................... 323/282; 323/222
[58] Field of Search ..................... 323/273, 274, 323/275, 280, 281, 282, 285, 303, 222; 363/19, 21, 23, 25

[56] References Cited

U.S. PATENT DOCUMENTS

| | | | |
|---|---|---|---|
| 4,504,898 | 3/1985 | Pilukaitis et al. | 363/21 |
| 4,551,668 | 11/1985 | Kammiller | 323/234 |
| 4,580,090 | 4/1986 | Bailey et al. | 323/282 |
| 4,942,509 | 7/1990 | Shires et al. | 323/285 |
| 5,134,355 | 7/1992 | Hastings | 323/222 |
| 5,264,782 | 11/1993 | Newton | 323/222 |
| 5,359,276 | 10/1984 | Mammano | 323/222 |

*Primary Examiner*—Matthew V. Nguyen
*Attorney, Agent, or Firm*—Nikaido, Marmelstein, Murray & Oram LLP

[57] ABSTRACT

A power supply unit comprising an output controller which is supplied with an input voltage from a voltage source and controls the output voltage, an output voltage detector for detecting the output voltage, a stable operation signal generator that generates a signal for stably operating the output controller, and a reference signal generator for generating a reference signal, wherein the output voltage is produced by controlling the output controller based upon the signals from the output voltage detector, stable operation signal generator and reference signal generator, and wherein provision is made of an input voltage detector for detecting the input voltage and a stable operation signal-level changer for changing the level of the signal in response to fluctuations in the input voltage to improve the operation of the stable operation signal generator.

7 Claims, 9 Drawing Sheets

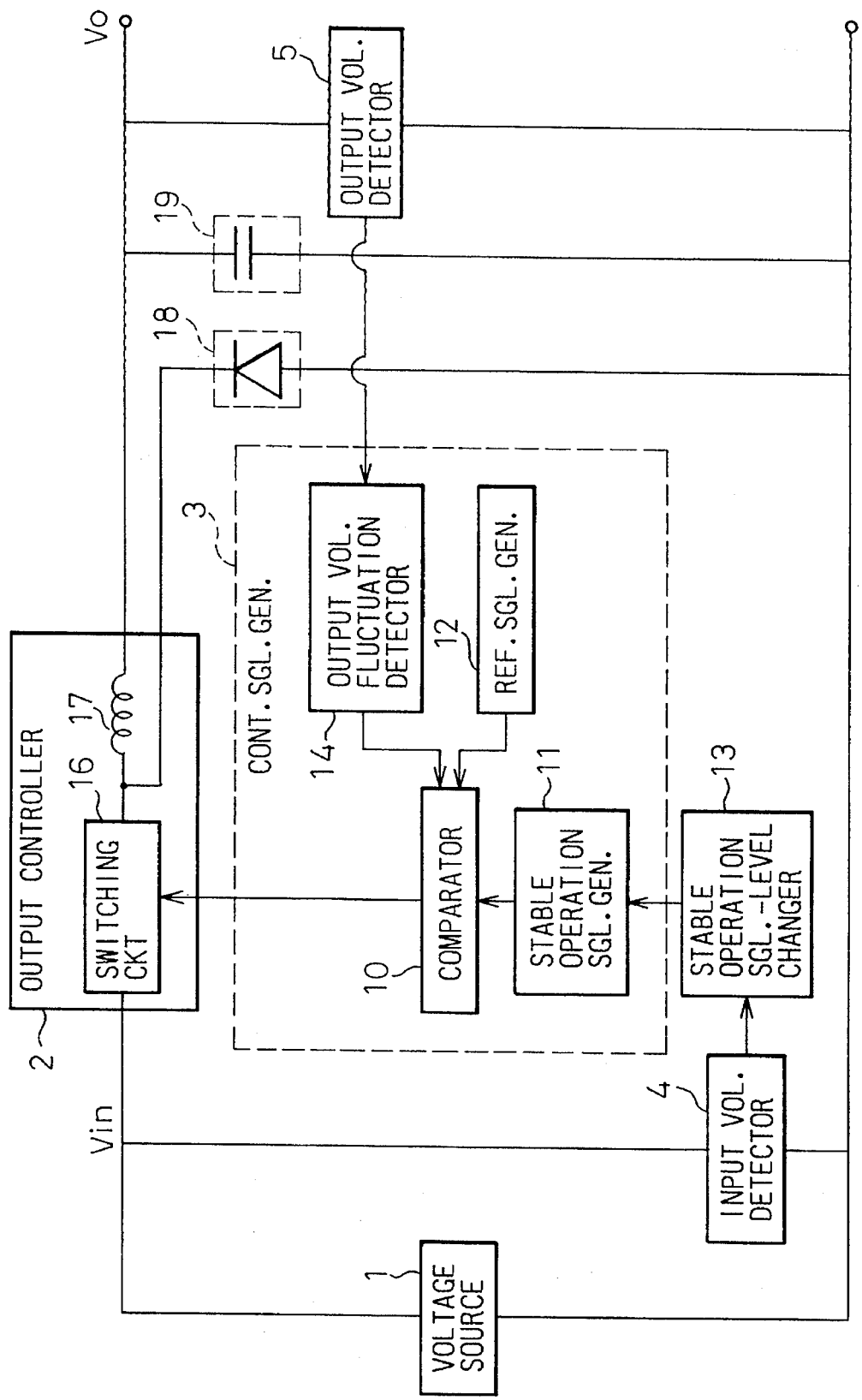

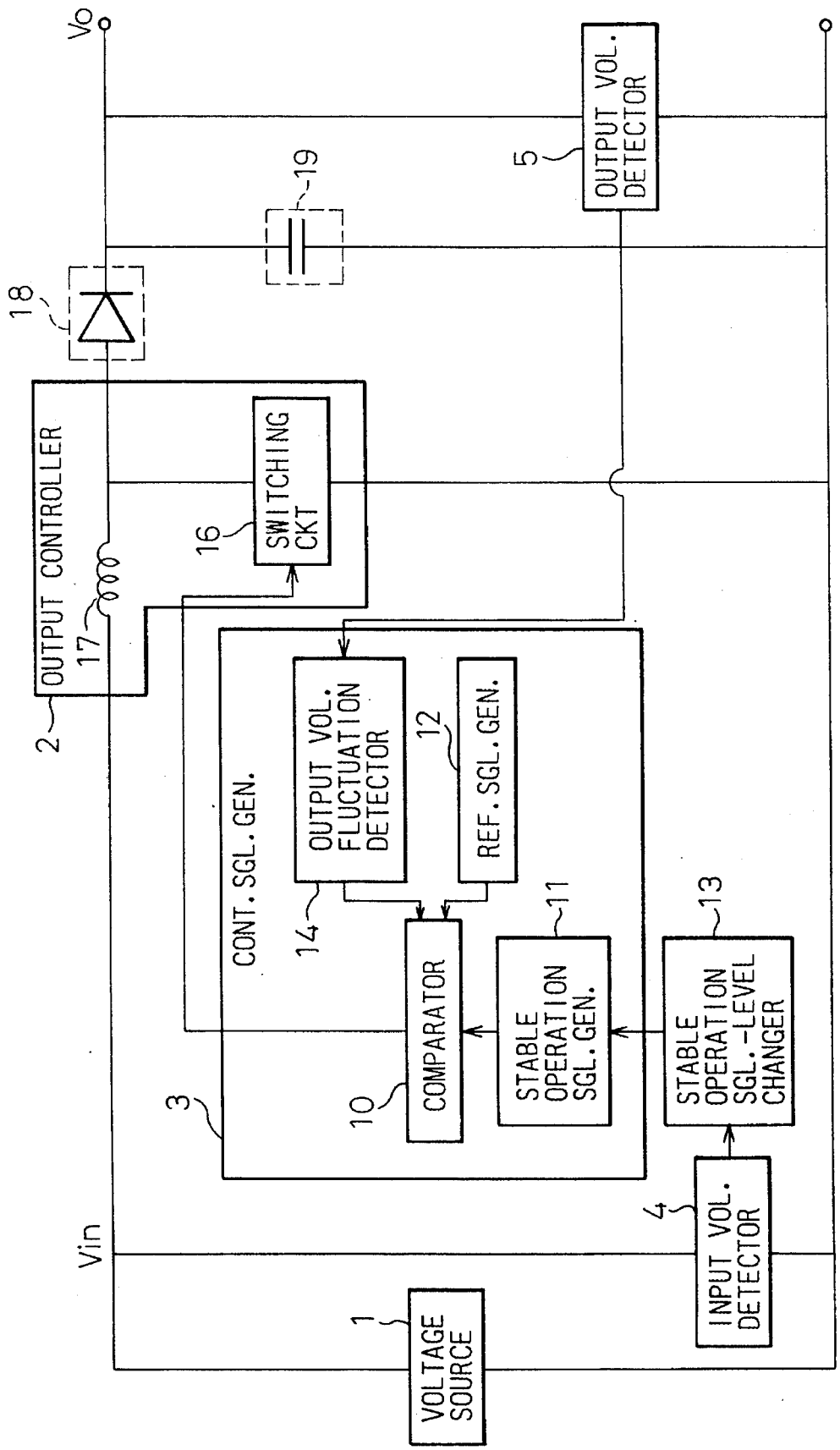

POWER SUPPLY UNIT

BACKGROUND OF THE INVENTION

1. Field of the Invention

The present invention relates to a power supply unit employing a DC—DC converter which can be used in portable electronic equipment such as note-book type personal computers and the like.

2. Description of the Related Art

In small electronic devices using battery cells, the power supply voltage drops as the cells are discharged. In order to maintain the voltage used in electronic equipment constant, therefore, use is made of a DC—DC converter which converts the cell output to a predetermined value to stabilize the output voltage. Such a power supply device can be classified into the one of the voltage-dropping type in which a voltage higher than the voltage used in the equipment is supplied from the cells and is dropped through the DC—DC converter to a voltage that is used in the equipment and the one of the voltage-boosting type in which a voltage lower than a voltage used in the equipment is increased by the DC—DC converter to a voltage used in the equipment, depending upon the relationship between the voltage of the cells mounted in the electronic equipment (or the voltage of the AC adapter) and the voltage used in the electronic equipment.

Whether the electronic equipment employs the power supply of the voltage-dropping type or of the voltage-boosting type is determined depending upon the power consumption of the equipment, the operation time that must be possible without renewing the cells, the size of equipment, the weight of equipment, etc.

A related art will be described below, in detail, with reference to the accompanying drawings.

FIG. 1 is a diagram illustrating a conventional power supply unit which is provided with a DC—DC converter of the pulse width modulation (PWM) type, wherein reference numeral 200 denotes a DC—DC converter, 201 denotes battery cells, 202 denotes a control signal generator that generates signals for controlling the turn-on and turn-off of a transistor Tr1, symbol Vin denotes an input voltage, Vo denotes an output voltage, C1 denotes an input capacitor for removing power supply noise, Tr1 denotes a switching transistor for controlling 10 the voltage, L1 denotes a choke coil, D1 denotes a diode, C2 denotes a smoothing output capacitor, R1 and R2 denote voltage-dividing resistors which detect a change in the output voltage and produce an output voltage detect signal EIN, R3 and R4 denote voltage-dividing resistors for forming a reference voltage to generate a stable operation signal DT for the control signal generator, and C3 denotes a capacitor which stabilizes the operation when the DC—DC converter is started, i.e., increases the level of stable operation signal when the power supply is started in order to gradually increase the high-level period of a control signal output by a comparator 211 (see FIG. 2) in the control signal generator 202.

In the constitution of FIG. 1, the control signal generator 202 generates a signal for turning on or off the transistor Tr1 that controls the output voltage. When the transistor Tr1 is turned on, energy is supplied from the cells 201 to the choke coil L1 (hereinafter referred to as coil L1) and is stored therein. Due to the energy stored when the transistor Tr1 is turned off, a fly-back current flows through coil L1—capacitor C2—diode D1 to produce an output voltage Vo across the voltage-dividing resistors R1 and R2. The control signal generator 202 generates a control pulse having a small duty ratio when the output voltage Vo is higher than the reference voltage and generates a pulse signal having a large duty ratio when the output voltage Vo is lower than the reference voltage. Accordingly, the transistor Tr1 is turned on for a short period of time when the output voltage Vo is high and is turned on for a long period of time when the output voltage Vo is low, so that the output voltage Vo is stabilized.

FIG. 2 illustrates a conventional control signal generator, wherein reference numeral 202 denotes a control signal generator and 210 denotes an error amplifier (ERR-AMP) which compares an output voltage detect signal EIN with a reference voltage Vref and outputs a signal ERO. The signal ERO increases with an increase in the output voltage detect signal EIN and decreases with a decrease in the output voltage detect signal EIN.

Reference numeral 211 denotes a comparator (PWM-COMP) which compares an output ERO of the error amplifier 210, a stable operation signal obtained by dividing the voltage Vref of a reference cell 214, to a triangular wave output from a triangular wave oscillator 212, that will be described later, and generates a control signal CPO. Reference numeral 212 denotes the triangular wave oscillator which generates triangular waves, and 213 denotes a driver which amplifies and outputs a voltage that is output from the comparator 211. Symbol EIN denotes an output voltage detect signal, ERO denotes an output signal from the error amplifier 210, CPO denotes an output signal from the comparator 211, DT denotes a stable operation signal, Vref denotes a reference voltage of the error amplifier 210, and R3, R4 and C3 denote items that were described above.

In the constitution of FIG. 2, the comparator 211 compares the triangular wave output from the triangular wave oscillator 212 output ERO from the error amplifier 210, to the stable operation signal, and generates a high-level signal (CPO) during a period in which the voltage of the triangular wave is larger than either the output ERO of the error amplifier 210 or the stable operation signal, whichever is larger (the transistor Tr1 is turned on when the signal CPO is at a high level). The driver 213 amplifies the output CPO of the comparator 211 and feeds it as a control signal to the transistor Tr1.

FIGS. 3A to 3C are diagrams illustrating the operation of a power supply unit, wherein ERO denotes an output of the error amplifier and DT denotes a stable operation signal. The threshold value is a voltage above which the comparator 211 produces a high-level output. When a triangular wave having a voltage larger than the threshold value is input, the comparator 211 operates as described below. Symbol CPO denotes an output signal of the comparator. FIG. 3A represents a case where ERO>DT. Since the output ERO is larger than the stable operation signal DT, the comparator 211 outputs a high-level signal (signal CPO of the high level) during a period in which the triangular wave is larger than the threshold value and the output ERO. That is, the comparator 211 outputs the signal CPO at the high-level during the period from time t0 to time t1 and during the period from time t2 to time t3.

FIG. 3B represents the case where ERO>DT as in the case of FIG. 3A. The triangular wave becomes larger than the stable operation signal DT and the output ERO during a period from time t0' to time t1' and during a period from time t2' to time t3'. During these periods, a high level signal CPO is output from the comparator. The period in which the triangular wave is larger than the output ERO becomes longer than that of the case of FIG. 3A and, hence, the period in which the output CPO has a high level is lengthened.

FIG. 3C represents the case where DT>ERO. Since the output ERO is larger than the stable operation signal DT, the comparator 211 outputs a high-level signal (signal CPO of the high level) during a period in which the triangular wave is larger than the threshold value and the stable operation signal DT. That is, the comparator 211 outputs the signal CPO of the high level during the period from time t0" to time t1" and during the period of from time t2" to time t3".

FIG. 4 illustrates another conventional power supply unit, wherein reference numeral 220 denotes a DC—DC converter, 221 denotes battery cells, 222 denotes a control signal generator, Vin denotes an input voltage, Vo denotes an output voltage, C1 denotes an input capacitor for removing noise, Tr1 denotes a switching transistor for controlling the output voltage, L1 denotes a choke coil, D1 denotes a diode, C2 denotes a smoothing output capacitor, R1 and R2 denote voltage-dividing resistors that detect a fluctuation in the output voltage and form an output voltage detect signal EIN, R3 and R4 denote voltage-dividing resistors for forming a reference voltage to generate a stable operation signal for the control signal generator 222, EIN denotes an output voltage detect signal, DT denotes a stable operation signal, Vref denotes a reference voltage of an error amplifier 210 (see FIG. 2) in the control signal generator 222, and C3 denotes a capacitor for stabilizing the operation when the DC—DC converter is started.

In the constitution of FIG. 4, an electric current flows into the coil L1 and into the capacitor C1 while the transistor Tr1 is turned off, and energy is stored therein. Due to the energy that is stored during the period in which the transistor Tr1 is turned off, a fly-back current flows through the circuit of diode D1—capacitor C2—transistor Tr1, and an output voltage Vo is obtained. The operation of the control signal generator 222 is the same as that of the case of FIG. 1 and is not described here.

In the constitution of FIG. 1, the input voltage Vin is applied to the coil L1 and to the capacitor C2 while the transistor Tr1 is turned on. When the transistor Tr1 is turned off, the fly-back current flows through the circuit made up of diode D1, coil L1 and capacitor C2 due to the stored energy, and a smoothed output voltage Vo is produced.

Here, the output voltage Vo is given by the following equation, $$Vo = Vin \times Ton/(Ton + Toff) = Vin \times Ton/T$$

where T is a period of the triangular wave, Ton is a period in which the transistor Tr1 remains turned on, and Toff is a period in which the transistor Tr1 remains turned off.

By controlling the duty ratio of a pulse signal output by the control signal generator 202, the output voltage Vo can be set to be constant despite a change in the input voltage Vin.

As represented by the operation of FIGS. 3A and 3B, when the output voltage has changed toward the higher side, the output ERO of the error amplifier 210 increases and the duty ratio of the signal CPO decreases. When the output voltage has changed toward the lower side, the output ERO of the error amplifier 210 decreases and the duty ratio of the signal CPO increases. When the output voltage has changed toward the higher side by controlling the duty ratio, the output voltage Vo can be reduced and when the output voltage has changed toward the lower side, the output voltage Vo can be increased.

Considered below is the case where there is no stable operation signal in the above-mentioned operation. When the output voltage Vo is close to zero due to a drop in the output voltage at the time of starting the power supply or being caused by a sudden change in the load, the error amplifier 210 produces an output ERO which is zero. In such a case, the signal CPO acquires the high level for nearly the whole period of one cycle, whereby an excess current may flow into the transistor Tr1 and damage it. In order to prevent this, a stable operation signal is input to the comparator 211 so as to become larger than the threshold value. Even when the signal ERO is close to zero, therefore, the output CPO of the comparator 211 is maintained at the low level until the voltage of the triangular wave exceeds the stable operation signal, thereby to limit the current that flows through the transistor Tr1.

When the output voltage Vo is smaller than the stable operation signal (such as when the power supply is started), the duty ratio of the signal CPO output from the comparator 211 is expressed as described below (duty ratio of the period in which the switching transistor Tr1 is turned off). The output of the comparator 211 has a low level during a period in which the stable operation signal is larger than the voltage of the triangular wave. Therefore, when the voltage of the stable operation signal is denoted by Vdt, Duty (off)=100×(Vdt−minimum voltage of triangular wave)/amplitude of triangular wave (%), $$Vdt = Vref \times R4/(R3 + R4)$$

The average input current Iin flowing into the coil L1 becomes equal to the product of the output current Io and the duty ratio of the transistor Tr1, and is given by, $$Iin = Io \times Ton/T$$

Moreover, a maximum current Ipeak flowing into the coil L1 is determined by the inductance of the coil L1, input voltage Vin and output voltage Vo, and is given $$Ipeak = Ton \times (Vo - Vin)/L$$

where L is the inductance of the choke coil.

As described above, the output current in the DC—DC converter of the PWM control system is determined by the ratio of Ton to Toff. On the other hand, when the input voltage Vin to the DC—DC converter is much larger than the output voltage Vo, an excess of current flows into the choke coil L1 and through the switching transistor Tr1 causing the operation to become unstable. In order to stabilize the operation even in such a case, therefore, the period Ton (duty ratio) in such a state must be shortened. When the input voltage Vin cannot be increased compared with the output voltage Vo, on the other hand, a sufficient current is not obtained when the period Ton is short. Therefore, the period Ton must be lengthened.

An excess current is generated when the DC—DC converter is started. The output voltage Vo is 0 V at the start time, and an excess current (inrush current) flows through the transistor Tr1 since the difference between the input voltage Vin and the output voltage Vo is large. To prevent the large inrush current, a method can be employed to temporarily shorten the period Ton at the start time. This is called a mild start in which the voltage of the stable operation signal is increased at the start time to shorten the period Ton, the stable operation signal is gradually lowered and the period Ton is gradually lengthened. For this purpose, in FIGS. 1 and 4, provision is made of the capacitor C3, and the voltage of the stable operation signal is gradually pulled down in compliance with the time constant to gradually lengthen the period Ton.

Right after the start, the maximum value of the period Ton gradually increases. After the passage of a predetermined period of time which complies with the operation of the DC—DC converter, however, the period Ton is set to a potential determined by the resistors R3 and R4. Thereafter, the Ton time becomes nearly constant though it may vary to a small degree depending upon the fluctuation in the output voltage.

As described above, the conventional DC—DC converter of the PWM control system is without problem while the input voltage Vin does not change much. When cells are used as an input power supply, however, the cell voltage gradually drops with the passage of time. When the input voltage Vin drops to such an extent that it is little different from the output voltage Vo, the maximum value of the output current decreases, too. Therefore, the output becomes insufficient before the cells are depleted, making it no longer possible to carry out the operation using the cells. So far, therefore, the input voltage had to be maintained at a level that is high to some extent. When the cell voltage drops below a predetermined value, the cells must be renewed.

SUMMARY OF THE INVENTION

It is an object of the present invention to provide a power supply unit which makes it possible to obtain a stable output voltage even when the input voltage has dropped.

According to the present invention, in view of the problems inherent in the prior art, an input voltage is monitored, the level of the stable operation signal is maintained high when the input voltage is high to shorten the high-level period of the control signal, and the level of the stable operation signal is lowered when the input voltage is low to lengthen the high-level period of the control signal.

According to the present invention, there is provided a power supply unit comprising an output controller which receives an input voltage from a voltage source and controls an output voltage, an output voltage detector for detecting the output voltage, a control signal generator which receives a signal from the output voltage detector to detect a fluctuation signal in the output voltage, generates a signal for stably operating the output controller, and outputs a signal for controlling the output controller in response to the detected fluctuation signal in the output voltage, the signal for stably operating the output controller an input voltage detector which receives an input voltage from the voltage source to detect the input voltage, and a stable operation signal-level changer which receives a signal from the input voltage detector, detects a decrease of the input voltage, and feeds an output to the control signal generator so as to change the level of signal for stably operating the output controller in accordance with the decrease of the input voltage, so that the output voltage of the output controller becomes a predetermined voltage.

According to one aspect of the present invention, there is provided a power supply unit comprising a voltage source, a switching circuit for receiving an input voltage from the voltage source, an induction element for receiving the output of the switching circuit, a rectifier connected between the return wire side of the voltage source and a connection point at which the switching circuit and the induction element are connected together, an output voltage detector which is connected between the output of the induction element and the return wire side of the voltage source, and detects the output voltage, a control signal generator which receives a signal from the output voltage detector to detect a fluctuation signal in the output voltage, generates a signal for stably operating the switching circuit, and outputs a signal for controlling the switching circuit in response to the detected fluctuation signal in the output voltage, the signal for stably operating the switching circuit an input voltage detector which receives an input voltage from the voltage source to detect the input voltage, and a stable operation signal-level changer which receives a signal from the input voltage detector detects a decrease of the input voltage, and feeds an output to the control signal generator so as to change the level of signal for stably operating the switching circuit to operate the switching circuit in accordance with the decrease of the input voltage so that the output voltage becomes a predetermined voltage.

According to another aspect of the present invention, there is provided a power supply unit comprising a voltage source, an induction element for receiving an input voltage from the voltage source, a switching circuit which receives through one terminal thereof an output from the induction element and is connected at the other terminal thereof to the return wire side of the voltage source, a rectifier which is connected at one terminal thereof to a point where the induction element and the switching circuit are connected together and is connected at the other terminal thereof to one of the output terminals, an output voltage detector which is connected between one of the output terminals and the return wire side of the voltage source and detects the output voltage, a control signal generator which receives a signal from the output voltage detector to detect a fluctuation signal in the output voltage, generates a signal for stably operating the switching circuit, and outputs a signal for controlling the switching circuit in response to the detected fluctuation signal in the output voltage, the signal for stably operating the switching circuit an input voltage detector which receives an input voltage from the voltage source to detect the input voltage, and a stable operation signal-level changer which receives a signal from the input voltage detector detects a decrease of the input voltage, and feeds an output to the control signal generator so as to change the level of signal for stably operating the switching circuit to operate the switching circuit in accordance with the decrease of the input voltage so that the output voltage becomes a predetermined voltage.

The control signal generator comprises a stable operation signal generator that generates a signal for stably operating the switching circuit, a reference signal generator for generating a reference signal, and a comparator for comparing a fluctuation signal in the output voltage, an output of the stable operation signal generator and an output of the reference signal generator, and the switching circuit is controlled by the output of the comparator.

The stable operation signal-level changer may be an operational amplifier which receives the reference voltage through a terminal of one polarity thereof and receives a voltage corresponding to the input voltage through a terminal of the opposite polarity thereof.

Other features and advantages of the invention will become apparent from the following description with reference to the accompanying drawings.

BRIEF DESCRIPTION OF THE DRAWINGS

FIG. 5 is a block diagram illustrating a basic constitution (1) of the present invention;

FIG. 6 is a block diagram illustrating a basic constitution (2) of the present invention;

DESCRIPTION OF THE PREFERRED EMBODIMENTS

Figure 1:
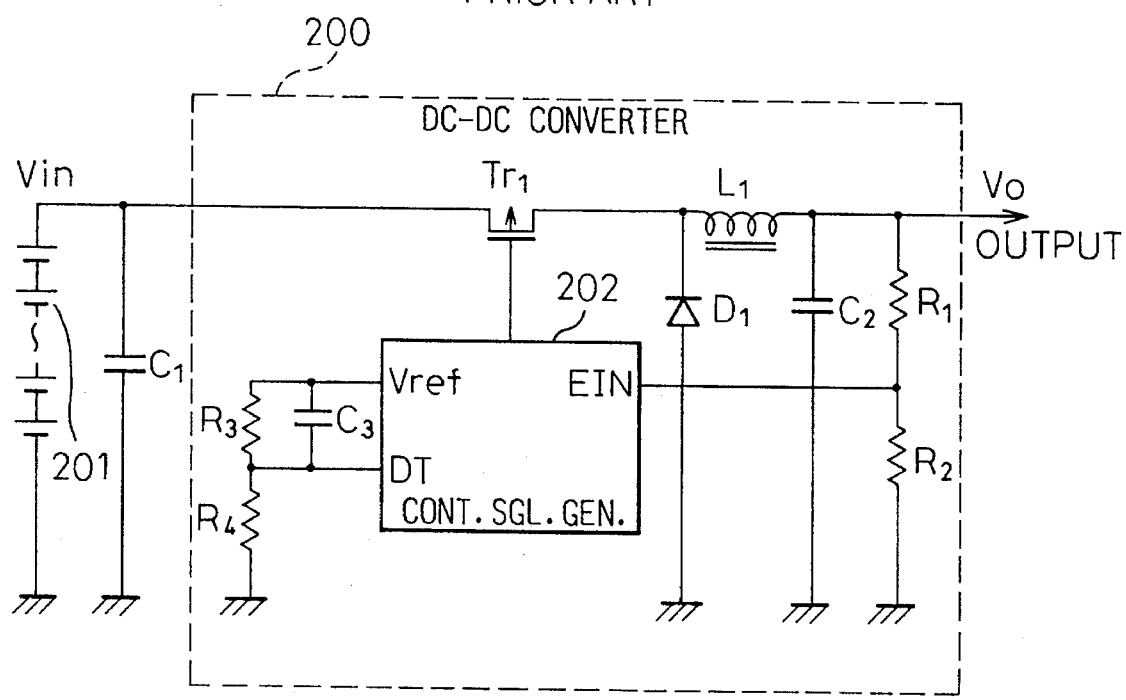
FIG. 1 is a circuit diagram of a conventional power supply unit.
Figure 2:
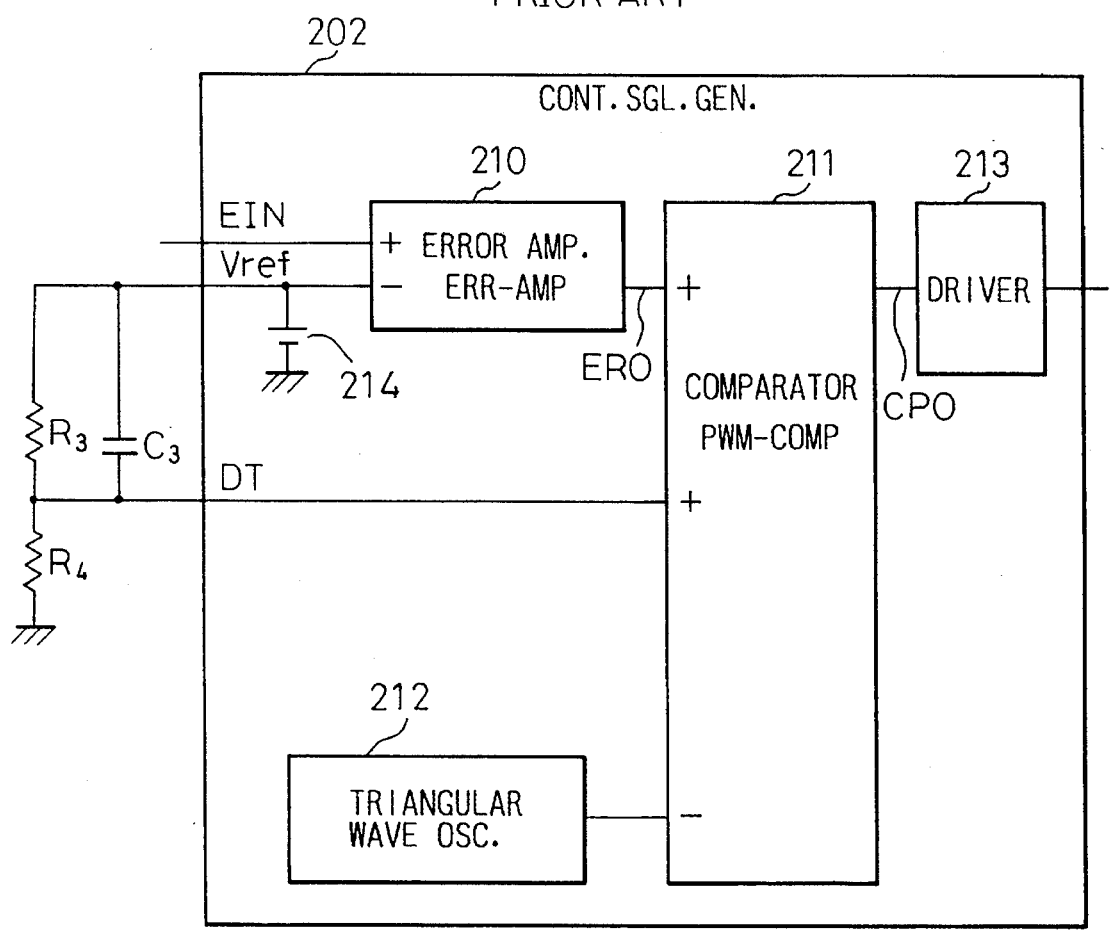
FIG. 2 is a block circuit diagram of a control signal generator in a conventional power supply unit.
Figure 3A:
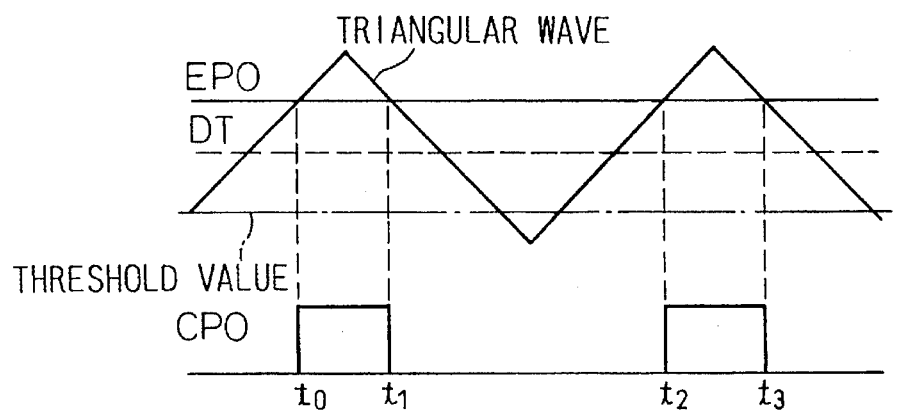
FIGS. 3A, 3B and 3C are diagrams for explaining the operation of the power supply unit.
Figure 3B:
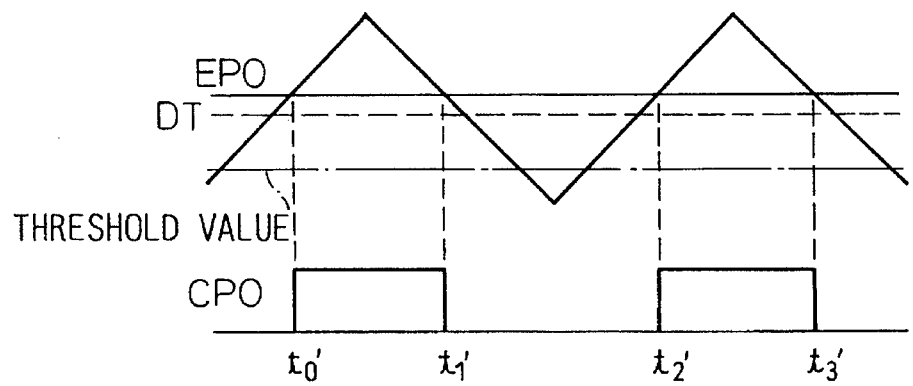
Figure 3C:
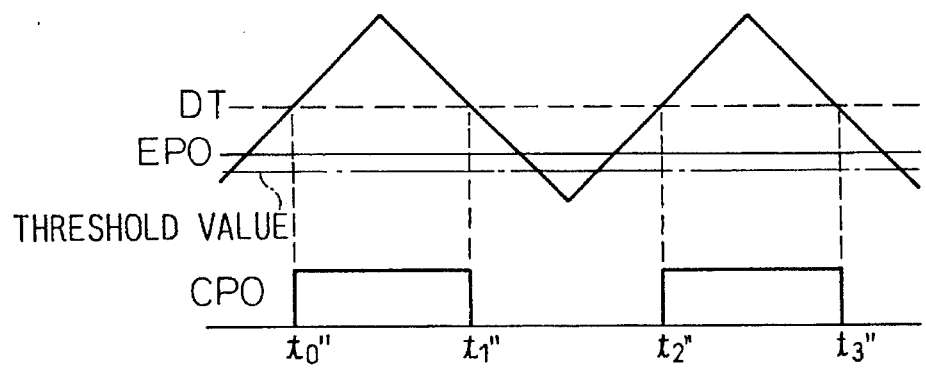
Figure 4:
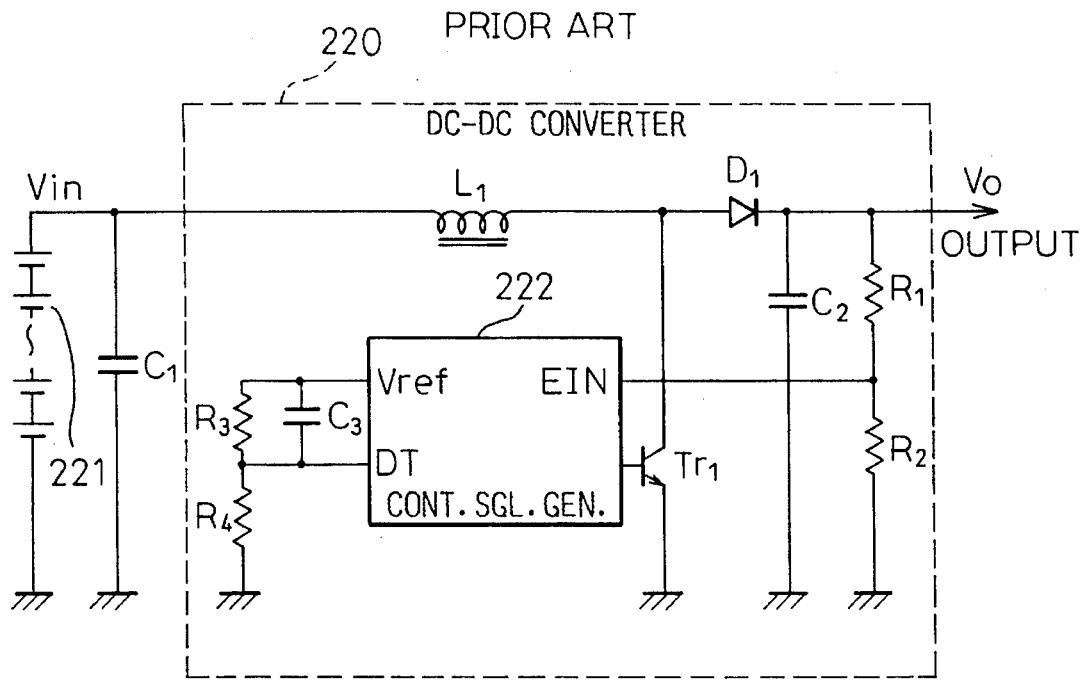
FIG. 4 is a circuit diagram of another conventional power supply unit.

Basic constitution of the present invention will be described below prior to describing the embodiments of the invention.

FIG. 5 illustrates a basic constitution (1) of the present invention, wherein reference numeral 1 denotes a voltage source which is constituted by battery cells or the like, 2 denotes an output controller which includes a switching circuit 16 constituted by a switching transistor or the like, 3 denotes a control signal generator which generates a control signal for controlling the switching operation of the output controller, 4 denotes an input voltage detector for detecting fluctuation in the voltage of the voltage source 1, and reference numeral 5 denotes an output voltage detector for detecting fluctuation in the output voltage Vo.

In the control signal generator 3, reference numeral 10 denotes a comparator which inputs and compares a detect signal EIN of the output voltage detector 5, a waveform (e.g., triangular wave) generated by a reference signal generator 12 and a stable operation signal generated by a stable operation signal generator 11, and generates a control signal for controlling the switching operation of the output controller 2. Reference numeral 11 denotes the stable operation signal generator which generates a signal such that when the output voltage Vo is small, an excess current will not flow into the output controller 2 so that the stability of the operation will not be lost, reference numeral 12 denotes the reference signal generator which generates a reference waveform (e.g., triangular wave) which is used as a reference by the comparator 10 for generating a control signal, reference numeral 13 denotes a stable operation signal-level changer which generates a signal for changing the level of stable operation signal generated by the stable operation signal generator 11 depending upon fluctuations in the input voltage, and reference numeral 14 denotes an output voltage fluctuation detector for detecting fluctuations in the output voltage.

In the output controller 2, reference numeral 16 denotes a switching circuit, and 17 denotes a coil which may be a choke coil.

Reference numeral 18 denotes a rectifier equipped with a diode, and 19 denotes a smoothing circuit equipped with a capacitor.

In the above-mentioned constitution, the switching circuit 16 in the output controller 2 may be provided in parallel with the voltage source 1.

FIG. 6 illustrates a basic constitution (2) of the present invention in the case where the switching circuit 16 is connected in parallel with the voltage source 1. In FIG. 6, the same constituent portions as those of FIG. 5 are denoted by the same reference numerals.

According to the present invention as described above, the power supply unit comprises the output controller 2 which is supplied with an input voltage from the voltage source 1 and controls the output voltage, the output voltage detector 5 for detecting the output voltage, the stable operation signal generator 11 that generates a signal for stably operating the output controller 2, and the reference signal generator 12 for generating a reference signal, wherein the output voltage is produced by controlling the output controller 2 based upon the signals from the output voltage detector 5, stable operation signal generator 11 and reference signal generator 12, and wherein provision is made of the input voltage detector 4 for detecting the input voltage and of the stable operation signal-level changer 13 for changing the level of the signal in response to fluctuation in the input voltage to stabilize the operation of the stable operation signal generator 11.

Figure 7A:
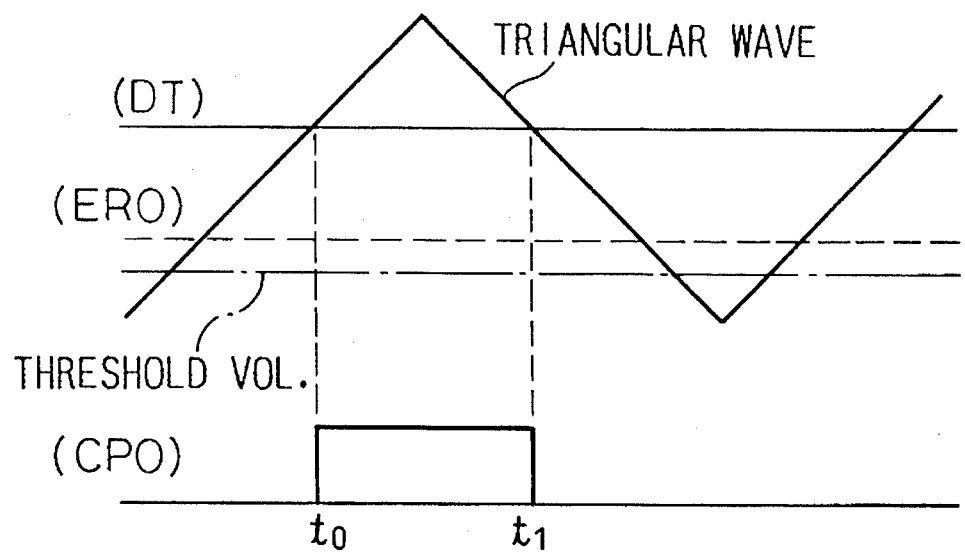
FIGS. 7A and 7B are diagrams illustrating the operation of the basic constitution of the present invention.

The operations of the basic constitutions of the invention shown in FIGS. 5 and 6 will now be described with reference to FIGS. 7A and 7B in which a triangular wave is used as a reference waveform for generating a control signal. FIG. 7A illustrates the operation when the input voltage is high (the voltage of the voltage source 1 is high), wherein symbol DT denotes a stable operation signal, ERO denotes a signal generated based upon the output signal of the output voltage detector, and CPO denotes an output signal of the comparator 10. The signal ERO is output from the output voltage fluctuation detector 14.

In the basic constitutions of FIGS. 5 and 6, the comparator 10 inputs a stable operation signal generated from the stable operation signal generator 11, a triangular wave generated from the reference signal generator 12 and a signal ERO that varies depending upon the voltage fluctuation detected by the output voltage detector 5, and produces a control signal CPO.

The stable operation signal generator 11 generates a stable operation signal, and the comparator 10 generates a control signal CPO which, for example, turns the output controller 2 on during a period from t0 to t1 in which the triangular wave is larger than the stable operation signal. During the period in which the control signal CPO is at a high level, the output controller 2 is turned on and a current flows to the output from the voltage source 1.

Figure 7B:
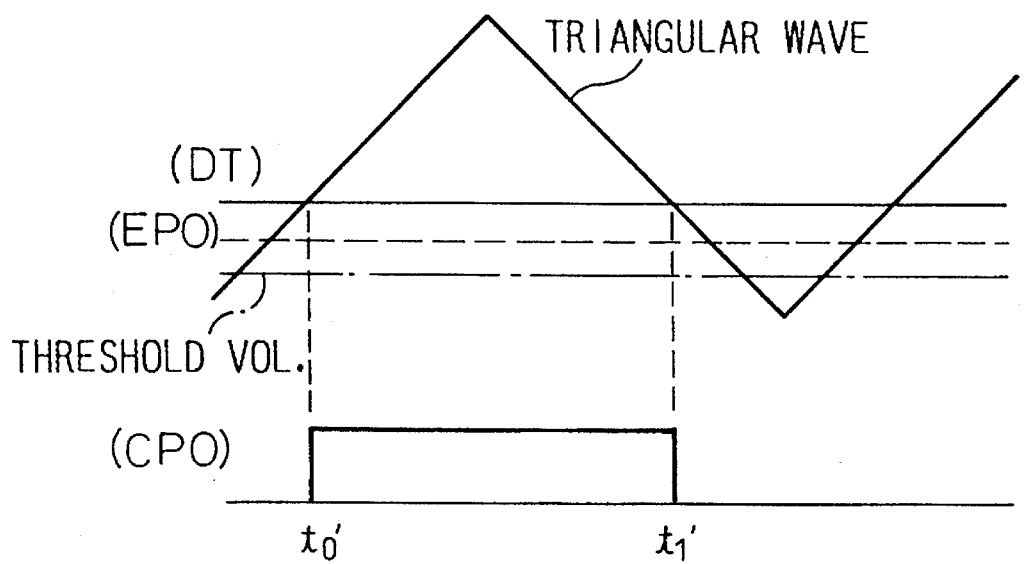

FIG. 7B illustrates the operation when the input voltage is low (the voltage of the power source 1 is low). The input voltage detector 4 detects a drop in the voltage of the voltage source 1. Upon detecting a drop in the input voltage in the input voltage detector 4, the stable operation signal-level changer 13 generates a signal to inform the stable operation signal generator 11 of the drop. Upon receiving this signal, the stable operation signal generator 11 lowers the level of the stable operation signal.

As a result, as shown in FIG. 7B, the comparator 10 generates a signal CPO which has a high level during a period from t0' to t1' in which the voltage of the triangular wave is larger than the stable operation signal, and the output controller 2 is turned on during the period of from t0' to t1'. Accordingly, the period in which the output controller 2 is turned on is lengthened, and a current flows into the output side which is larger than that when the voltage of the voltage source 1 is high.

According to the present invention as described above, the level of the stable operation signal is changed depending upon the voltage of the voltage source 1; i.e., the period in which the output control unit 2 remains turned on is lengthened when the voltage of the voltage source 1 has dropped, so that a large amount of energy is taken out from the voltage source 1 and is passed to the output side. Therefore, the electric power can be stably supplied to the output even when the voltage of the voltage source 1 has dropped.

In the foregoing the case when the output controller is turned on when the control signal has the high level was described. It is, however, also allowable to so constitute the control signal generator and the output controller that the transistor Tr1 is turned on when the control signal has a low level.

Figure 8:
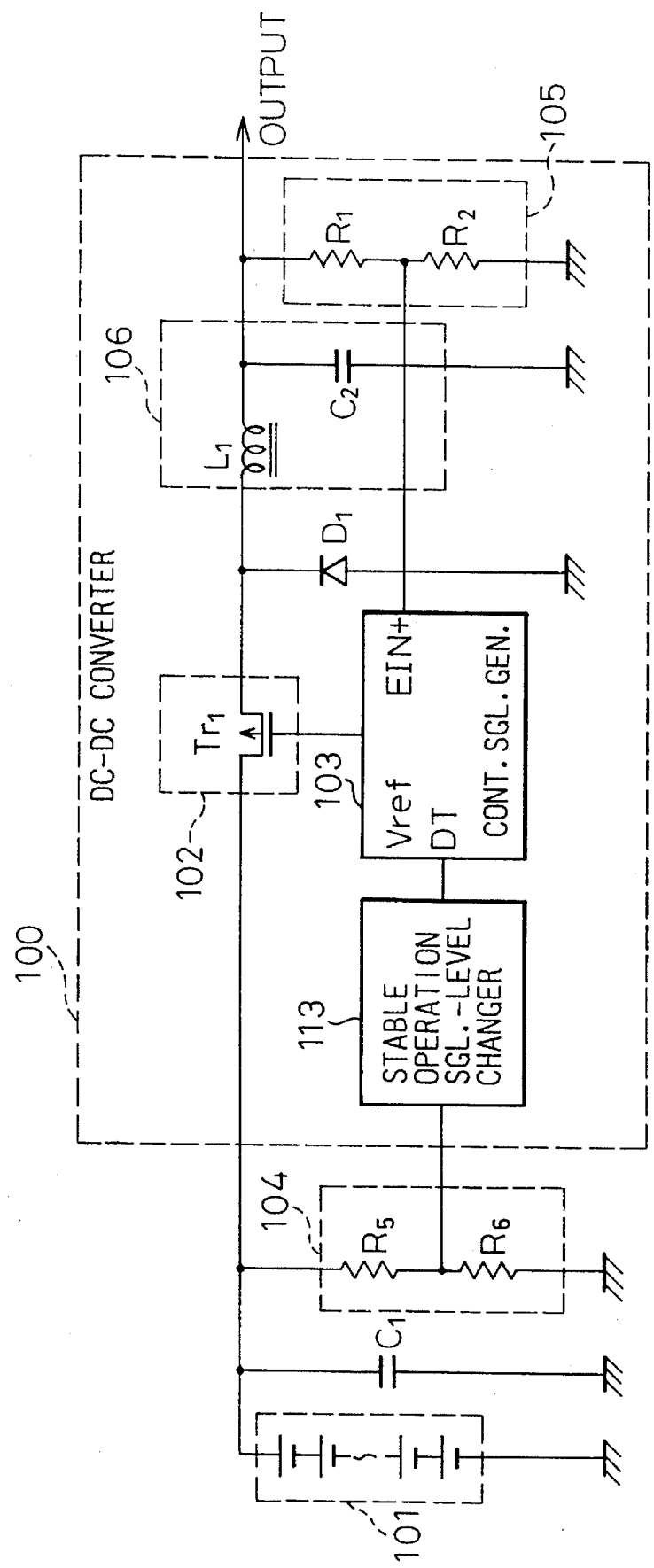
FIG. 8 is a circuit diagram of a power supply unit according to an embodiment of the present invention.

An embodiment of the present invention will now be described with reference to FIG. 8, wherein reference numeral 100 denotes a DC—DC converter, 101 denotes a voltage source made up of battery cells, 102 denotes an output controller wherein Tr1 denotes a switching transistor. Reference numeral 103 denotes a control signal generator and 104 denotes an input voltage detector, wherein R5 and R6 are resistors for dividing the input voltage, and reference numeral 105 denotes an output voltage detector wherein R1 and R2 are resistors for dividing the output voltage. Reference numeral 106 denotes a smoothing circuit which boosts and smoothes the voltage output from the voltage source 1, and wherein L1 is a choke coil and C2 is a smoothing capacitor. Reference numeral 113 denotes a stable operation signal-level changer and C1 denotes an input capacitor.

The operation of the constitution of FIG. 8 will be described later.

Figure 9:
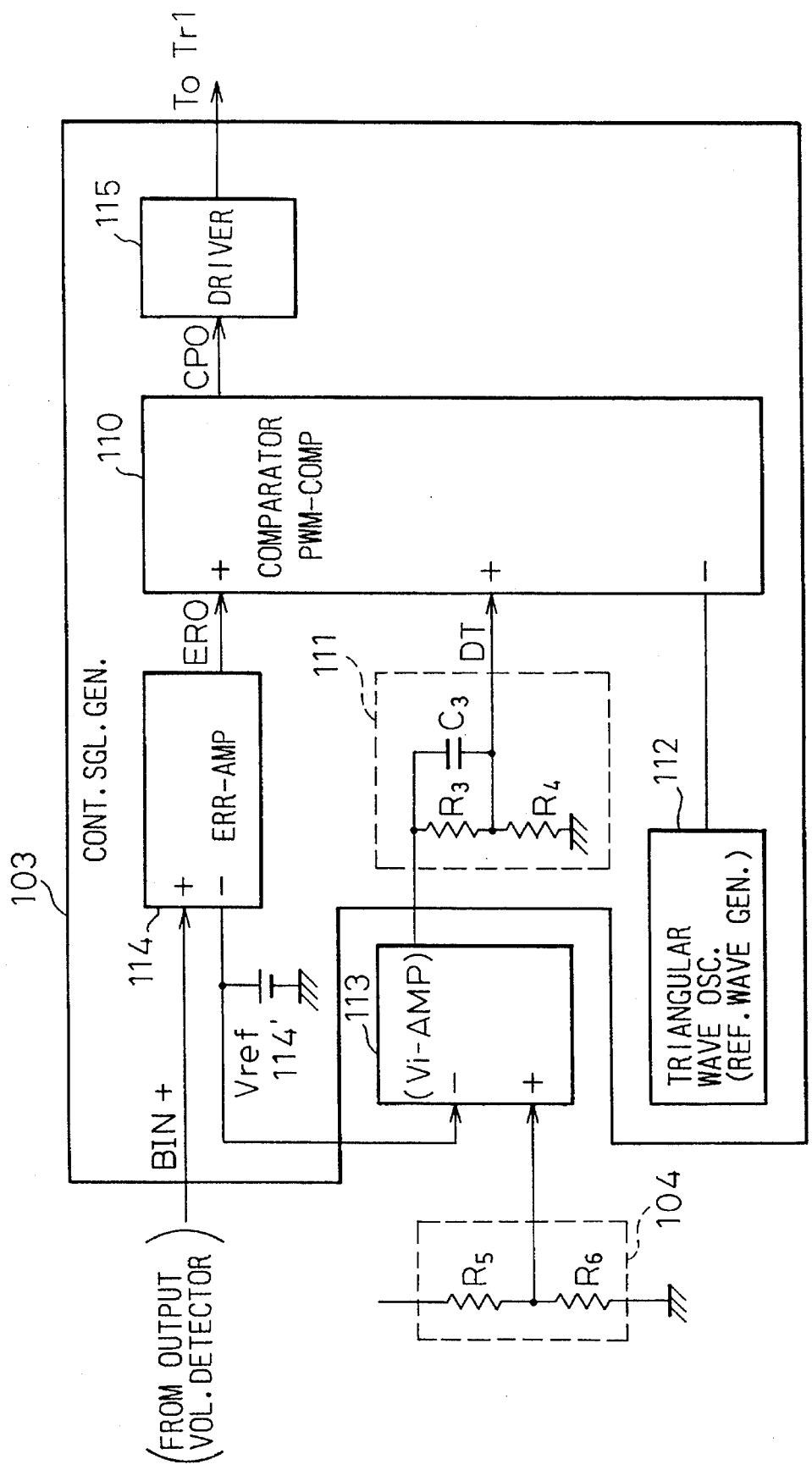
FIG. 9 is a block diagram of a control signal generator in the power supply unit of FIG. 8.

FIG. 9 illustrates a control signal generator according to an embodiment of the present invention, wherein reference numeral 103 denotes a control signal generator, 110 denotes a comparator (PWM COMP), and 111 denotes a stable operation signal generator (Vi-AMP) wherein R3 and R are voltage-dividing resistors, and C3 is a capacitor for soft operation. Reference numeral 112 denotes a triangular wave oscillator which corresponds to the reference signal generator 12 in FIGS. 5 and 6, and reference numeral 113 denotes a stable operation signal-level changer which receives an input detect voltage through a non-inverted terminal thereof, receives a reference voltage Vref through an inverted terminal thereof, and compares the input voltage. When the input voltage drops, the stable operation signal-level changer 113 produces an output of a decreased value. Reference numeral 114 denotes an error amplifier (ERR-AMP) which corresponds to the output voltage fluctuation detector 14 in FIGS. 5 and 6, 114' denotes a reference cell, and 115 denotes a driver.

Operation of the embodiment of the present invention will now be described with reference to FIGS. 8 and 9.
(a) When the voltage of the voltage source 101 is high:

The stable operation signal-level changer 113 inputs a high voltage detected by the input voltage detector 104 and outputs a large value. The output value is divided by the resistors R3 and R4 in the stable operation signal generator and is input as a stable operation signal to the comparator 110.

When the output voltage Vo (EIN) is low, the error amplifier 114 outputs a signal ERO of a small value. When the stable operation signal DT is larger than the signal ERO, the output CPO of the comparator 110 is determined by the magnitudes of the triangular wave and stable operation signal. Here, the stable operation signal has a large value since the input voltage is high. Accordingly, the pulse signal CPO output from the comparator 110 has a small duty ratio, and the switching transistor Tr1 in the output controller 102 remains turned on for only a short period of time permitting a small amount of current to flow into the output side. As the time passes, the output voltage becomes gradually high. As the signal ERO becomes larger than the signal DT, the output CPO of the comparator 110 is then determined by the signal ERO and a stable operation condition is established.
(b) When the voltage of the voltage source 101 is low:

The stable operation signal-level changer 113 inputs a low voltage from the input voltage detector 104 and outputs a small value. The output value is divided by the resistors R3 and R4 in the stable operation signal generator and is input as a stable operation signal to the comparator 110. When the output voltage Vo is low, the error amplifier 114 outputs a signal ERO which is smaller than the signal DT. When the signal ERO is smaller than the signal DT, the output CPO of the comparator 110 is determined by the magnitudes of the triangular wave and stable operation signal. Here, the stable operation signal has a small value since the input voltage is low. Accordingly, the pulse signal CPO output from the comparator 110 has a large duty ratio, and the switching transistor Tr1 in the output controller 102 remains turned on for an extended period of time permitting a large amount of current to flow to the output. Therefore, an increased output voltage is obtained despite a drop in the input voltage. As the time passes, the output voltage becomes gradually high. As the signal ERO becomes larger than the signal DT, the output CPO of the comparator 110 is then determined by the signal ERO and a stable operation condition is established.

According to the present invention, the DC—DC converter can be stably operated even when the output voltage has dropped due to a sudden change in the load. Moreover, stable operation is realized even when the output voltage has dropped at the time of starting the operation or due to a sudden change in the load in a state where the cell voltage has dropped. Accordingly, the cells can be used for an extended period of time.

We claim:

1. A power supply unit comprising:
   an output controller which receives an input voltage from a voltage source and controls an output voltage;
   an output voltage detector for detecting said output voltage;
   a control signal generator which receives a signal from said output voltage detector to detect a fluctuation in the output voltage, generates a signal for stably operating said output controller, and outputs a signal for controlling said output controller in response to the detected fluctuation signal in the output voltage, the signal for stably operating said output controller;
   an input voltage detector which receives an input voltage from said voltage source to detect the input voltage;
   and a stable operation signal-level changer which receives a signal from said input voltage detected, detects a decrease of the input voltage, and feeds an output to said control signal generator so as to change the level of signal for stably operating said output controller in accordance with the decrease of the input voltage so that the output voltage of the output controller becomes a predetermined voltage.

2. A power supply unit comprising:
   a voltage source;
   a switching circuit for receiving an input voltage from said voltage source;
   an induction element for receiving the output of said switching circuit;

a rectifier connected between the return wire side of said voltage source and a connection point at which said switching circuit and said induction element are connected together;

an output voltage detector which is connected between the output of said induction element and the return wire side of said voltage source, and detects the output voltage;

a control signal generator which receives a signal from said output voltage detector to detect a fluctuation in the output voltage, generates a signal for stably operating said switching circuit, and outputs a signal for controlling said switching circuit in response to the detected fluctuation in the output voltage, the signal for stably operating said switching circuit;

an input voltage detector which receives an input voltage from said voltage source to detect the input voltage; and a stable operation signal-level changer which receives a signal from said input voltage detector, detects a decrease of the input voltage, and feeds an output to said control signal generator so as to change the level of signal for stably operating said switching circuit to operate said switching circuit in accordance with the decrease of the input voltage so that the output voltage becomes a predetermined voltage.

3. A power supply unit according to claim 2, wherein said control signal generator comprises a stable operation signal generator that generates a signal for stably operating said switching circuit, a reference signal generator for generating said reference signal, and a comparator for comparing a fluctuation signal in said output voltage, an output of said stable operation signal generator and an output of said reference signal generator, and said switching circuit is controlled by the output of said comparator.

4. A power supply unit according to claim 2, wherein said stable operation signal-level changer is an operational amplifier which receives the reference voltage through a terminal of one polarity thereof and receives a voltage corresponding to the input voltage through a terminal of the opposite polarity thereof.

5. A power supply unit comprising:

a voltage source;

an induction element for receiving an input voltage from said voltage source;

a switching circuit which receives through one terminal thereof an output from said induction element and is connected at the other terminal thereof to the return wire side of said voltage source;

a rectifier which is connected at one terminal thereof to a point where said induction element and said switching circuit are connected together and is connected at the other terminal thereof to one of the output terminals;

an output voltage detector which is connected between one of said output terminals and the return wire side of said voltage source, and detects the output voltage;

a control signal generator which receives a signal from said output voltage detector to detect a fluctuation signal in the output voltage, generates a signal for stably operating said switching circuit, and outputs a signal for controlling said switching circuit in response to the detected fluctuation signal in the output voltage, the signal for stably operating said switching circuit;

an input voltage detector which receives an input voltage from said voltage source to detect the input voltage; and a stable operation signal-level changer which receives a signal from said input voltage detector, detects a decrease of the input voltage, and feeds an output to said control signal generator so as to change the level of signal for stably operating said switching circuit to operate said switching circuit in accordance with the decrease of the input voltage so that the output voltage becomes a predetermined voltage.

6. A power supply unit according to claim 5, wherein said control signal generator comprises a stable operation signal generator that generates a signal for stably operating said switching circuit, a reference signal generator for generating said reference signal, and a comparator for comparing a fluctuation in said output voltage, an output of said stable operation signal generator and an output of said reference signal generator, and said switching circuit is controlled by the output of said comparator.

7. A power supply unit according to claim 5, wherein said stable operation signal-level changer is an operational amplifier which receives the reference voltage through a terminal of one polarity thereof and receives a voltage corresponding to the input voltage through a terminal of the opposite polarity thereof.

\* \* \* \* \*